(12) United States Patent
Park et al.

(10) Patent No.: US 8,880,117 B2
(45) Date of Patent: Nov. 4, 2014

(54) MECHANICAL INPUT-OUTPUT DEVICE FOR MOBILE TERMINAL

(75) Inventors: Jun Sang Park, Gyeonggi-do (KR); Seog Guen Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 709 days.

(21) Appl. No.: 12/715,438

(22) Filed: Mar. 2, 2010

(65) Prior Publication Data

US 2010/0234076 A1 Sep. 16, 2010

(30) Foreign Application Priority Data

Mar. 11, 2009 (KR) .................. 10-2009-0020613

(51) Int. Cl.
*H04M 1/00* (2006.01)
*H04M 1/02* (2006.01)
*G06F 3/0362* (2013.01)
*H04M 1/23* (2006.01)
*H04M 1/725* (2006.01)

(52) U.S. Cl.
CPC ........ *H04M 1/0206* (2013.01); *H04M 1/72563* (2013.01); *H04M 1/0241* (2013.01); *H04M 1/0235* (2013.01); *G06F 3/0362* (2013.01); *H04M 1/72522* (2013.01); *H04M 1/233* (2013.01)
USPC ..................... 455/550.1; 455/556.1; 455/566; 455/575.1; 455/575.4

(58) Field of Classification Search
USPC ........ 455/566, 405, 550.1, 557, 575.1, 575.8, 455/575.6, 128, 153.1, 556.1–559, 575.4
See application file for complete search history.

(56) References Cited

U.S. PATENT DOCUMENTS

| 2004/0214612 | A1* | 10/2004 | Park et al. ..................... 455/566 |
| 2004/0222980 | A1* | 11/2004 | Lee ............................. 345/184 |
| 2007/0271528 | A1* | 11/2007 | Park et al. ..................... 715/810 |
| 2008/0171572 | A1* | 7/2008 | Choi et al. ................. 455/556.1 |

* cited by examiner

*Primary Examiner* — Ajit Patel
(74) *Attorney, Agent, or Firm* — Cha & Reiter, LLC

(57) ABSTRACT

A mechanical information input/output device of a mobile terminal permits various functions to be selected or adjusted according to changing positions of certain mechanical structures therein. The mechanical terminal preferably includes: a case for forming an external form with a predetermined form; and a mechanical information output unit provided at one side of the case and formed with at least one mechanical structure that changes a disposition by information according to a user function of the mobile terminal.

19 Claims, 10 Drawing Sheets

250 : 220, 230, 240

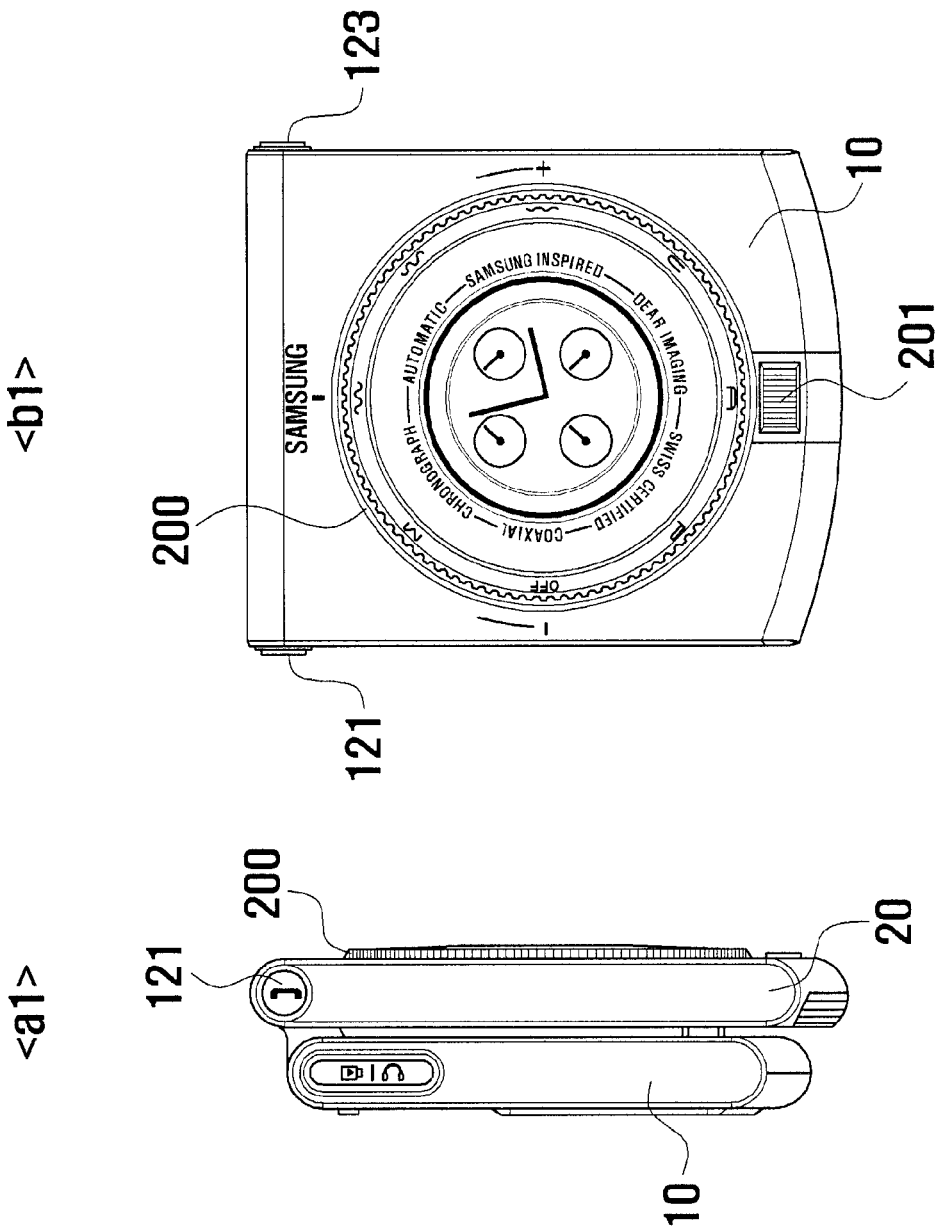

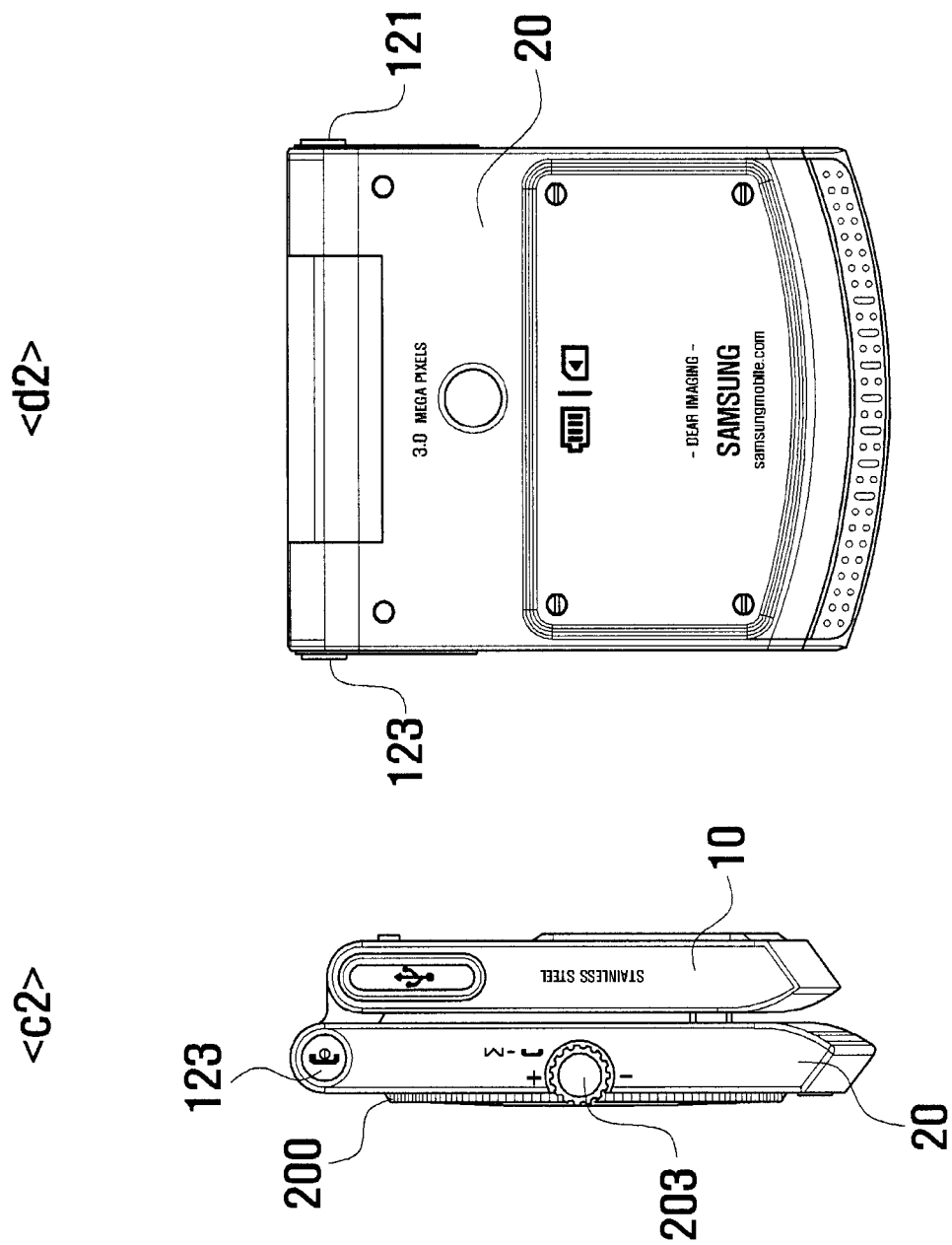

MECHANICAL INPUT-OUTPUT DEVICE FOR MOBILE TERMINAL

CLAIM OF PRIORITY

This application claims the benefit of priority from Korean Patent Application No. 10-2009-0020613 filed Mar. 11, 2009, the contents of which are herein incorporated by reference in its entirety.

BACKGROUND OF THE INVENTION

1. Field of the Invention

The present invention relates to input and output structures of a mobile terminal. More particularly, the present invention relates to a mobile terminal having various physical configurations in order to input or output certain information associated with several functions of the mobile terminal.

2. Description of the Related Art

Nowadays, mobile terminals have become extremely popular because of their portability and functionality. Mobile terminals often include an MP3 function corresponding to a file reproduction function, or an image photographing function corresponding to a digital camera for photographing an image. Further, the mobile terminal supports many other functions, such as a function of performing a mobile game or an arcade game, in addition to providing communication services such as voice data and text messaging.

The mobile terminal is classified into various forms such as a slide type, folder type, flip type, and bar type according to a use form. The slide type mobile terminal can be conveniently operated with one hand and is widely used due because the structure permits the ability to greatly extend an entire area of the mobile terminal. Further, as the folder type mobile terminal has been developed over a long period of time, mechanical stability has been engineered into such mobile terminals, and thus the folder type mobile terminal is widely used by many mobile terminal users.

The mobile terminal uses a digital type of liquid crystal display or organic light emitting display in order to display information stored in the mobile terminal. A conventional mobile terminal outputs communication information, message information, and other mobile terminal related information on a display device by a user's control and performs user input using an input device provided in a keypad or on a touch screen. In such a conventional digital type mobile terminal, in order to input and output information, a specific operation, for example, by performing a slide up/down and folder up/down of the mobile terminal, a specific menu is activated, and a corresponding menu is selected.

Accordingly, in a conventional mobile terminal, in order to select a simple function, various operations often need to be repeatedly performed so that information related to the mobile terminal can be obtained after activating the display device.

SUMMARY OF THE INVENTION

The present invention provides a mechanical information input/output device of a mobile terminal that can support direct selection or adjustment of a function in which a user frequently uses or a necessary function in order to acquire information related to the mobile terminal in an intuitive manner.

In accordance with an exemplary aspect of the present invention, a mechanical information input/output device of a mobile terminal permits manipulation in a disposition (i.e. order, arrangement) of the structure to set, adjust or manipulate information according to a user function of the mobile terminal.

A mechanical information input/output device of a mobile terminal comprises: a case for forming an external form with a predetermined shape; and a mechanical information output unit provided at one side of the case and formed with at least one mechanical structure, in which the at least one mechanical structure is associated with at least one predefined function such that a change in a position, order or arrangement of the at least one mechanical structure permits manipulation to set, adjust or manipulate at least one user function of the mobile terminal Preferably, the mechanical structure includes at least one of the following types of structures: a first mechanical structure for displaying a residual amount of a battery of the mobile terminal; a second mechanical structure for displaying a residual amount of a memory of the mobile terminal; a third mechanical structure for displaying reception signal intensity of the mobile terminal; a fourth mechanical structure for displaying a message function of the mobile terminal; a fifth mechanical structure for displaying a communication time period according to a communication function and a file reproduction time period according to file reproduction of the mobile terminal; and a sixth mechanical structure for displaying time information according to a time display function of the mobile terminal.

Preferably, the mechanical information input/output device further includes an information input unit provided at one side of the case in order to generate different input signals associated with a change in a disposition (i.e. arrangement or order) of a specific structure included in the mechanical structure in order to set and manipulate a user function of the mobile terminal.

BRIEF DESCRIPTION OF THE DRAWINGS

The above features and advantages of the present invention will become more apparent from the following detailed description in conjunction with the accompanying drawings, in which:

FIG. 5A and FIG. 5B are a perspective view illustrating a folder type mobile terminal having an information input/output unit according to another exemplary embodiment of the present invention;

FIG. 6A and FIG. 6B are a perspective view illustrating a folder type mobile terminal having an exemplary information input/output unit according to yet another exemplary embodiment of the present invention;

DETAILED DESCRIPTION

Hereinafter, exemplary embodiments of the present invention are described in detail with reference to the accompanying drawings. The same reference numbers are used throughout the drawings to refer to the same or similar parts. The views in some of the drawings are schematic views only, but in any event, even the perspective views are not intended to be to scale or correctly proportioned. Detailed descriptions of well-known functions and structures incorporated herein may be omitted to avoid obscuring appreciation of the subject matter of the present invention by a person of ordinary skill in the art.

While the present invention may be embodied in many different forms, specific exemplary embodiments of the present invention are shown in drawings and are described herein in detail, with the understanding that the present disclosure is to be considered as an exemplification of the principles of the invention and is not intended to limit the claimed invention to the specific exemplary embodiments illustrated herein.

Figure 1:
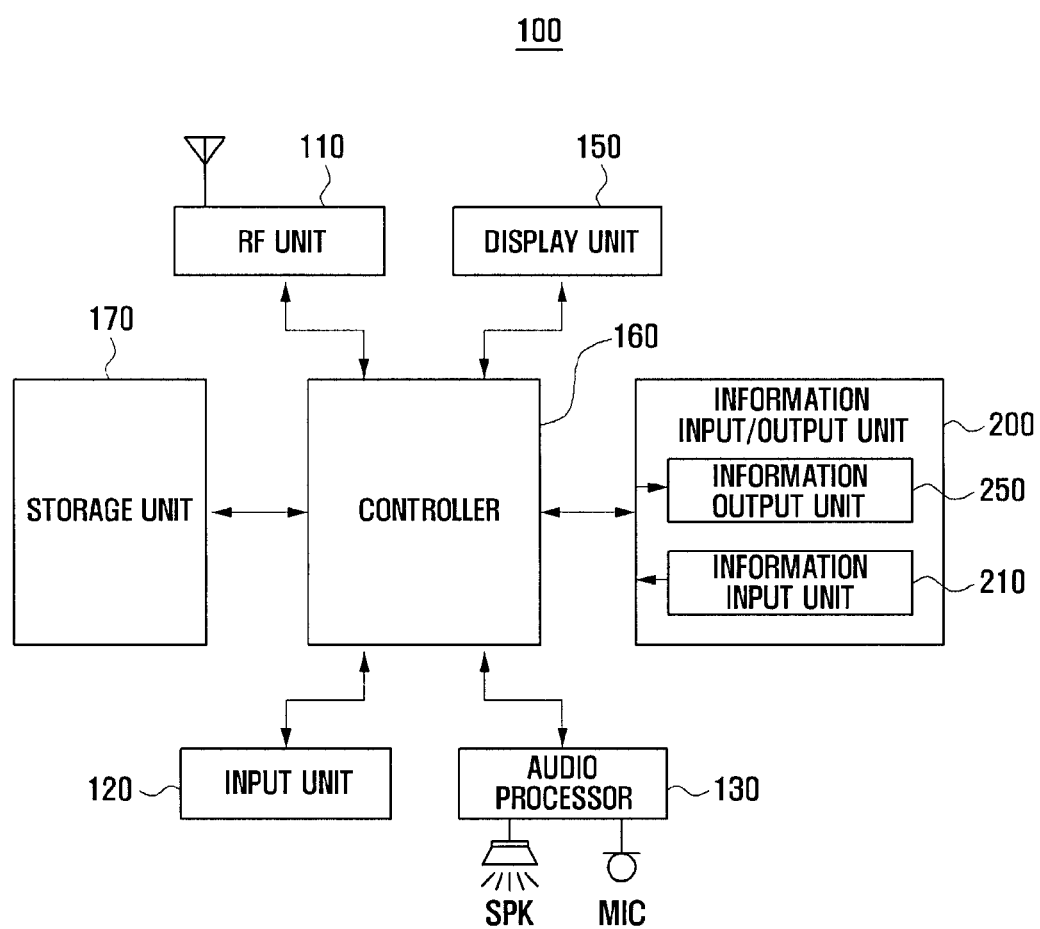
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring now to FIG. 1, a mobile terminal 100 according to the present exemplary embodiment preferably includes a radio frequency (RF) unit 110, input unit 120, audio processor 130, display unit 150, controller 160, storage unit 170, and information input/output unit 200. The artisan should understand and appreciate that the units shown in FIG. 1 may be at least partially combined.

In the mobile terminal 100 having the above-described exemplary configuration, the information input/output unit 200 is formed in a specific area of the mobile terminal 100. For example in a folder type mobile terminal, the information input/output unit 200 can be formed in an area in which an auxiliary display unit is provided, i.e. an opposite area of an area at which a battery is disposed, or an area in which a battery is disposed in a state in which a folder of the folder type terminal is declined, and the information input/output unit 200 is provided permits the direct set or adjustment of various functions of the mobile terminal 100 by a user control, as well as various information related to the mobile terminal 100 is output through the information input/output unit 200.

The RF unit 110 preferably performs a function of forming a communication channel for performing voice communication and for transmitting data such as an image by the control of the controller 160. That is, the RF unit 110 preferably forms a voice communication channel, a data communication channel, and an audiovisual communication channel between mobile communication systems. In order to form such communication channels, the RF unit 110 preferably includes an RF transmitter for up-converting a frequency of a signal to be transmitted and amplifying the signal, and an RF receiver for low-noise amplifying a received signal and down-converting a frequency of the signal. The artisan understands and should appreciate that a transceiver or separate transmitting and receiving units are within the scope of the claimed invention. The RF unit 110 performs a function of transmission and reception a message upon using a message service and outputs the received message to the storage unit 170 by the control of the controller 160. Further, the RF unit 110 receives a signal for a communication request and outputs, when a message for a communication request from a mobile communication system is received, the message to the controller 160. When the communication request is not connected, the controller 160 causes an automatic record of a call received during absence of the mobile terminal user. The RF unit 110 outputs information about a communication channel formed by the control of the controller 160 to the information input/output unit 200.

The input unit 120 preferably includes a plurality of input keys and function keys for inputting numeral information or character information and for setting various functions. The function keys include a direction key, side key, and hotkey that are set to perform a specific function. Further, the input unit 120 generates a key signal related to user setting and a function control of the mobile terminal 100 and outputs the key signal to the controller 160. The input unit 120 can be embodied with for example, a QWERTY keypad, a DOVRAK keypad, a 3*4 keypad, and a 4*3 keypad including a plurality of keys, just to name some possibilities. The input unit 120 outputs an input signal generating when the user presses a specific key of the keypad to the controller 160 and in this case, the input unit 120 generates various input signals by a presently activated application program.

Still referring to FIG. 1, the audio processor 130 includes a speaker SPK for reproducing audio data transmitted and received upon performing communication and a microphone MIC for collecting a user's sound or other audio signals upon communication. A volume of the microphone MIC and the speaker SPK of the audio processor 130 is changed by adjusting an information input unit 210 provided in the information input/output unit 200. When the mechanical device has a function in which the information input unit 210 can adjust a ringtone, microphone MIC, and speaker SPK, if the mechanical device is adjusted by the user, an input signal for adjusting a volume of a ringtone, microphone MIC, and speaker SPK is generated, and as the input signal is output to the controller 160, a volume of the audio processor 130 is adjusted.

The display unit 150 displays various menus of the mobile terminal 100, information input by the user, or information provided to the user. That is, the display unit 150 provides various screens, for example, a standby screen, menu screen, message writing screen, and communication screen according to use of the mobile terminal 100. The display unit 150 provides various mechanical information that is output from the information output unit 250 as an image including a text. For example, when mechanical devices corresponding to a quantity of received messages, the display shows information regarding missed calls, received calls, sounds, muting, text, ringtones, etc that is output by output unit 250. In addition, the display unit 150 outputs information corresponding to each mechanical device of the information output unit 250 as an image including a text. Accordingly, when each information output to the display unit 150 is changed by the user's input signal, the controller 160 controls application of the information change to the mechanical devices. The display unit 150 can be formed with a liquid crystal display (LCD) and an organic light emitted diode (OLED). In addition, preferably any type of thin-film technology can be used for the display unit. The display unit 150 can be formed as part of a touch screen. When the display unit 150 is formed as part of a touch screen, the display unit 150 includes a display panel and a touch sensor. The touch sensor is disposed preferably at one side of the display unit 150 to occur a touch event according to a contact of an object or an access distance of an object and performs a function of outputting the occurred touch event to the controller 160. The touch sensors are disposed preferably in a matrix form over the entire display unit 150 and thus a touch event occurs at a specific position of the display unit 150 by an approach of the mobile terminal user's finger or an object.

The storage unit 170 stores an application program necessary for a function operation according to the present exemplary embodiment, an application program for reproducing the stored various files, and a key map or a menu map for operating a touch screen when the display unit 150 is formed in a touch screen. Such programs would preferably comprise executable code for execution by a processor, the code being stored on machine readable data, such as a memory. The key map and the menu map are each formed in various forms. That is, the key map may preferably comprise a keyboard map, 3*4 key map, DVORAK key map or QWERTY key map, just to name a few possibilities and may comprise a control key map for controlling operation of a presently activated application program. Further, the menu map may be a menu map for controlling operation of a presently activated application program and may be a menu map having various menus provided by the mobile terminal 100 as an item. The storage unit 170 preferably includes a program area and a data area. Particularly, in the present exemplary embodiment, the storage unit 170 includes a mechanical device support application program, preferably in a program area, for controlling input/output of information through the information input/output unit 200. The mechanical device support application program includes a routine for controlling to adjust mechanical devices corresponding to various information stored in the mobile terminal 100 and a routine for controlling to apply an input signal generating according to operation of the mechanical devices to the mobile terminal 100.

With continued reference to FIG. 1, the program area stores an operating system (OS) for booting the mobile terminal 100 and operating the above-described units, an application program for reproducing various files, for example, an application program for a communication function support according to a function support of the mobile terminal 100, web browser for connecting to an Internet server, MP3 application program for reproducing other sound sources, image output application program for reproducing a picture, and moving picture reproduction application program. The data area comprises an area for storing data generating according to use of the mobile terminal 100 and stores phonebook data and various contents. Further, when the display unit 150 is embodied as a touch screen, the data area stores user input that is input through the touch screen. Preferably, in the present exemplary embodiment, the data area separately stores information that is input and information to be output through the information input/output unit 200. That is, when a specific input signal is transferred from the information input unit 210 according to operation of the mechanical device, the data area updates information corresponding to the transferred signal by the control of the controller 160. For example, when ringtone setting information is stored in the data area and a bezel form structure for setting ringtone exists in the mechanical device, if the user generates an input signal for adjusting a specific function, i.e. ringtone setting by rotating the bezel structure, the controller 160 controls to adjust a ringtone according to the input signal and to update ringtone setting information in the data area.

The information input/output unit 200 preferably includes an information input unit 210 for generating an input signal for activating a specific function of the mobile terminal 100 and an information output unit 250 for outputting various information related to the mobile terminal 100. The information input unit 210 is formed preferably with a mechanical structure and is embodied in various forms, i.e. a polygon or a three-dimensional structure and includes a sensor for detecting movement of a three-dimensional structure according to user manipulation. As an example, the information input unit 210 includes a ring form of body, a gear for supporting a rotation of the ring, at least one alignment mark to be a moving reference of the gear, a sensor for detecting movement of the gear, or switch. The information input unit 210 generates a specific input signal by a user's operation control and outputs the signal to the controller 160. For example, as described above, when the information input unit 210 is formed in a ring form, the user can rotate a ring form of information input unit 210 by a predetermined angle in a predetermined direction about a central axis. In this case, the information input unit 210 generates an input signal corresponding to a rotation of a predetermined angle and outputs the signal to the controller 160. Accordingly, the controller 160 controls to activate a specific function corresponding to a rotation of the predetermined angle with reference to the previously stored setting information. A detailed description of the function activation is described in subsequently with reference to the drawings. The information output unit 250 is an element for outputting various information related to user function of the mobile terminal 100 and includes a portion of a mechanical device and a portion of a digital device for outputting corresponding information as an image including a text. For example, the information output unit 250 formed with a mechanical device includes at least one disk and indicators disposed within the at least one disk to change according to information input. In the present exemplary embodiment, the disk is described as a component for supporting the indicator, however the disk can be replaced with a polygonal panel. As an example, the information output unit 250 formed with the mechanical device includes a clock form of disk and at least one indicator for indicating a specific point of the outer side of the disk at a central axis of the disk. When the information output unit 250 displays specific information, for example, the quantity of unchecked messages of the mobile terminal 100, predetermined numerals are disposed at a predetermined gap along the outer circumferential side of the disk, and the indicator indicates a numeral corresponding to the quantity of presently unchecked messages. When a message is received in the mobile terminal, the information output unit 250 changes a position of the indicator according to a change of the reception quantity of a message. A detailed description of operation of the information output unit 250 is described in detail later with reference to the drawings.

The controller 160 supports performance of an initialization process by controlling power supplied to each unit of the mobile terminal 100 and when an initialization process is complete, the controller 160 controls operating the information input/output unit 200. That is, when power is supplied, the controller 160 activates a sensor for monitoring the information input unit 210 and controls performance of a specific function, for example, a function such as ringtone adjustment and volume adjustment of the mobile terminal 100 according to an input signal generating in the information input unit 210. When power is supplied, the controller 160 initializes a configuration for outputting specific information included in the information output unit 250, determines information stored in the mobile terminal 100, and controls to apply the corresponding information to the mechanical structure. For example, if the information output unit 250 is formed with a mechanical structure can represent a level that is set to indicate a ringtone exists, the information output unit 250 is initialized before power is supplied to the mobile terminal 100, when power is supplied, and the controller 160 determines corresponding ringtone setting information and controls to apply information corresponding to the ringtone setting information to the mechanical structure.

The controller 160 controls sustaining a mechanical control of the information output unit 250 even after power supply is stopped. For example, there is an assumption that a first mechanical structure for notifying a call received during absence of a mobile terminal user and a second mechanical structure for notifying the quantity of unchecked reception messages exist, an indicator included in the first mechanical structure indicates 3, and an indicator included in the second mechanical structure indicates 5. Accordingly, the controller 160 controls sustaining a value indicated by the first mechanical structure and the second mechanical structure even after power supply of the mobile terminal 100 is stopped. Accordingly, even if power supplied to the mobile terminal 100 is stopped, the mobile terminal user can intuitionally determine how much information that is not checked by the user exists before the supplied power supply is stopped.

Figure 2:
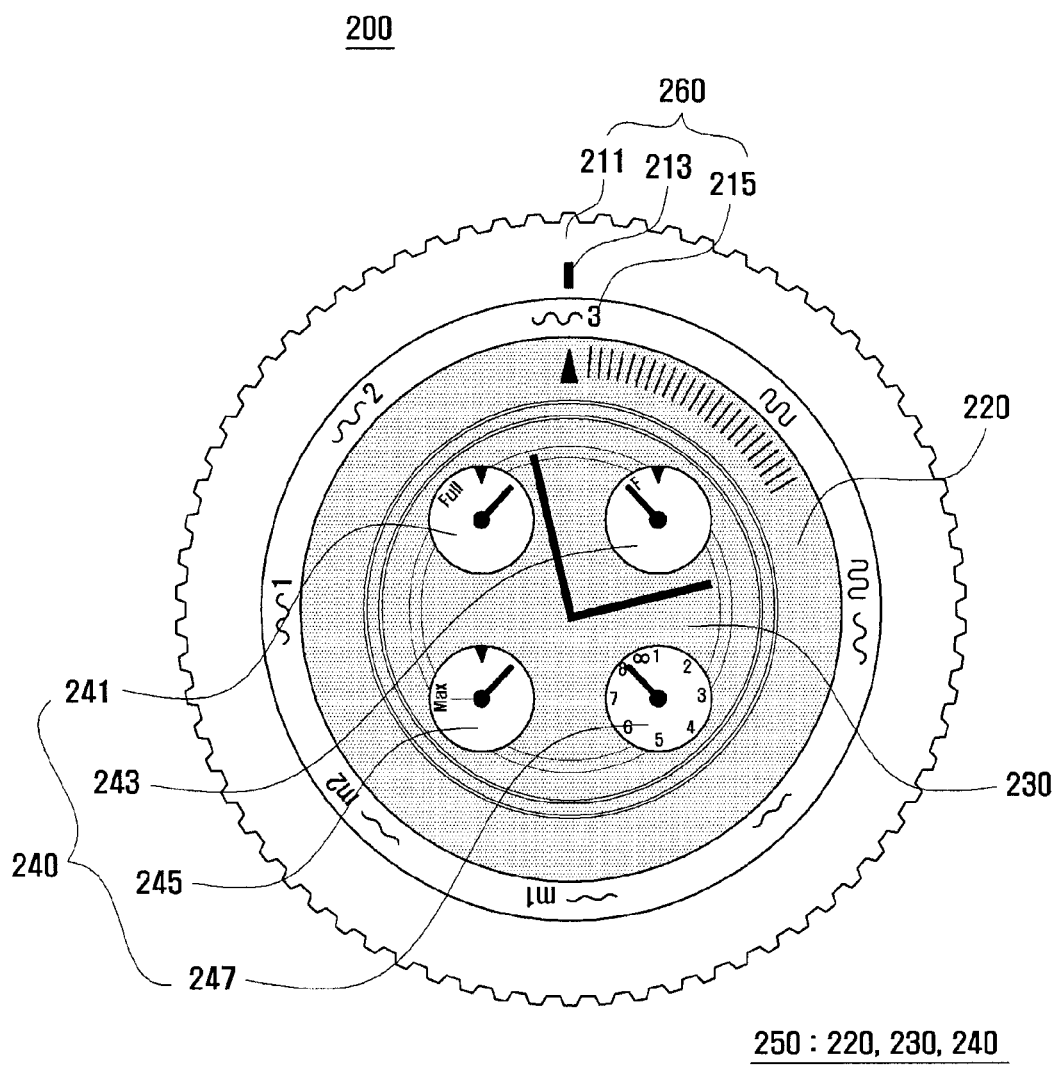
FIG. 2 is a diagram illustrating an exemplary configuration of an information input/output unit in the mobile terminal exemplified in FIG. 1.

FIG. 2 is a diagram illustrating a configuration of the information input/output unit 200 in the mobile terminal of FIG. 1.

The information input/output unit 200 can be divided into an information input unit and an information output unit and can be divided into a mechanical structure and a digital structure. The mechanical structure indicates a structure of mechanical devices for forming the inside and the outside of the mobile terminal 100, and the digital structure indicates a structure for outputting specific information as an image including a text on a display unit embodied with an LCD or OLED.

Referring now to FIG. 2, the information input/output unit 200 according to the present exemplary embodiment includes a mechanical information input unit 260 for setting a ringtone and an information output unit 250 comprised of an digital information output unit 220, an digital information output unit 230, and an mechanical information output unit 240 for outputting, upon performing a first function, second function, and third function of the mobile terminal 100, information according to the functions. The mechanical information input unit 260 includes a rotation unit 211 for rotating according to a user's operation control, an alignment mark 213 for providing a reference point to recognize a rotation operation, and a function display mark 215 for notifying each function of the mobile terminal 100. The rotation unit 211 can rotate by a physical force of a specific direction transferred from the outside and in this particular case, a rotation operation is performed in a gear form that can be easily recognized by the user. Accordingly, when a rotation operation is performed, the rotation unit 211 can provide a predetermined form of tactile impression, for example a friction impression. The alignment mark 213 is positioned at a specific point of the rotation unit 211 and rotates together along with a rotation of the rotation unit 211. The alignment mark 213 is recognized together with the function display mark 215 and represents a function of the mobile terminal 100 selected by the rotation unit 211. The mechanical information input unit 260 has a structure for setting a ringtone, but the present invention is not limited thereto, and the mechanical information input unit 260 can perform various settings, such as a ringtone setting, a vibration level setting, a volume level setting upon communication, even a mute setting of the mobile terminal 100, and a response message setting upon mute setting, just to name a few possibilities. For this reason, the function display mark 215 is mechanically provided by performing printing such as engraving or embossing in a corresponding area in order to perform a corresponding function.

The digital information output unit 220 is formed in an LCD or OLED to output specific information as a text or an image. In the digital information output unit 220, a ring-shaped housing is disposed at a display device formed in a quadrangle so as to be disposed in a ring shape, as shown in FIG. 2, or a display device separately formed in a ring shape is disposed. The digital information output unit 220 preferably outputs information according to a specific function of the mobile terminal 100, for example various functions such as a communication function, file reproduction function, clock function, and widget information output function. In more detail, when the digital information output unit 220 is set to output information related to a communication function, if a communication request message is received from another mobile terminal, the digital information output unit 220 outputs communication connection information including a message notifying an incoming call and a phone number of another mobile terminal. When a communication channel with another mobile terminal is formed, the digital information output unit 220 can display information about a communication time period with another mobile terminal as numbers or as an increase of a specific image. When the digital information output unit 220 is set to output information related to a file reproduction function, if a specific file is being reproduced, the digital information output unit 220 preferably outputs time information about a total time period and a presently reproducing time point of the reproducing file. In this case, the digital information output unit 220 preferably outputs time information about reproduction of the corresponding file as a text such as numerals, or as a specific image. The digital information output unit 220 may output fixed text information. That is, the digital information output unit 220 can output information about a world time. A detailed description thereof is described subsequently together with a description of the digital information output unit 230.

The digital information output unit 230 is positioned within the digital information output unit 220 and has a circular shape. Preferably there is a concentric arrangement between the output units 220, 230. The digital information output unit 230 can be formed, for example, with an LCD or an OLED, (or any type of thin-film technology display), similarly to the digital information output unit 220 and is formed in a circular display area by disposing a circular housing at a quadrangular display device, or is disposed by forming a display device in a circular shape. The digital information output unit 230 outputs information corresponding to a basic and widely used clock function of the mobile terminal 100. That is, the digital information output unit 230 preferably displays corresponding time information as text information such as numerals according to activation of a clock function, or disposes a bar corresponding to a minute hand and a hour hand to correspond to a time point. The display of time can be graphic information instead of or in addition to text information. When the digital information output unit 230 displays a time point as an image corresponding to an hour hand and a minute hand, the digital information output unit 220 can display a world time. For example, a specific world city name (Paris, New York, Seoul, etc.) having a time point indicated by an image corresponding to a present hour hand and minute hand is disposed at a ring-shaped circumferential edge of the digital information output unit 220.

The mechanical information output unit 240 is formed in a specific area within the digital information output unit 230. The mechanical information output unit 240 mechanically displays information corresponding to a specific function of the mobile terminal 100, for example a battery residual quantity display function, memory residual quantity display function, reception intensity display function, and message reception display function. For example, the mechanical information output unit 240 includes a mechanical structure 241, mechanical structure 243, mechanical structure 245, and fourth mechanical structure 247.

The mechanical structure 241 is a mechanical structure for displaying a battery residual quantity and includes a predetermined size of disk and a spear (i.e. "pointer") for indicating specific information to the disk. For example, a disk included in the mechanical structure 241 has a first display mark for indicating a full charging state of a battery and a second display mark for indicating a dead (empty) state of charge, and the spear indicates a specific point between the first display mark and the second display mark according to a battery residual charge quantity.

The mechanical structure 243 is a mechanical structure for displaying a memory residual quantity. The mechanical structure 243 includes a disk for displaying information about an entire memory capacity and a spear for displaying information about a present memory use amount by indicating a specific point of the disk.

The mechanical structure 245 is a mechanical structure for displaying reception signal intensity and represents reception signal intensity through a disk including a display mark for representing the best reception state and a display mark for representing the worst reception state and a spear for indicating a specific point of the disk. In this case, it is preferable that the mechanical structure 245 is controlled to display a spear for indicating reception signal intensity in real time according to mobility of the mobile terminal.

The fourth mechanical structure 247 is a structure for displaying information related to message reception and is a structure for outputting information about a message transmitted and received according to a message service of the mobile terminal 100. For this, the fourth mechanical structure 247 includes a disk in which information such as numerals representing a message reception quantity is described and a spear for indicating the message reception quantity through indicating a specific point of the disk by rotating about a specific shaft of the disk. The fourth mechanical structure 247 is formed with several sub-structures and in this case, the sub-structures include sub-structures having various functions of a message, for example a sub-structure having a display function of a unchecked received message, a sub-structure having a unchecked e-mail display function, and a sub-structure having a function of displaying a unchecked message among messages including an attached file.

In the above-described description, as the mechanical information output unit 240 is disposed within the digital information output unit 230, at least one of a text and an image representing information about a function of mechanical structures of the mechanical information output unit 240 is output in a predetermined area of the digital information output unit 230. Further, at least one of a text and an image representing information about a function of mechanical structures of the mechanical information output unit 240 may be output in a predetermined area of the digital information output unit 220.

The display marks displayed in the disk of the mechanical structure are preferably printed using a method such as engraving or embossing. Further, although the mechanical information output unit 240 has four mechanical structures, however the present invention is not limited thereto. That is, in the mechanical information output unit 240, the quantity of mechanical structures can be changed according to a designer's intention of the mobile terminal 100, and a function of the mechanical structure can be changed by a designer or a user of the mobile terminal 100. That is, in the above-described description, the mechanical structure 24 displays a battery residual quantity, however the mechanical structure 24 can display reception intensity and a memory residual quantity according to a setting change. In the above-description, the mechanical information output unit 240 outputs a battery residual quantity, reception signal intensity, a memory residual quantity, and information related to a message, however the mechanical information output unit 240 can output other functions of the mobile terminal 100, i.e. various functions such as a function notifying a call received during absence of a mobile terminal user and an alarm function according to a schedule. An information output related to such a function can be changed according to a designer's intention and a user's setting change.

Figure 3:
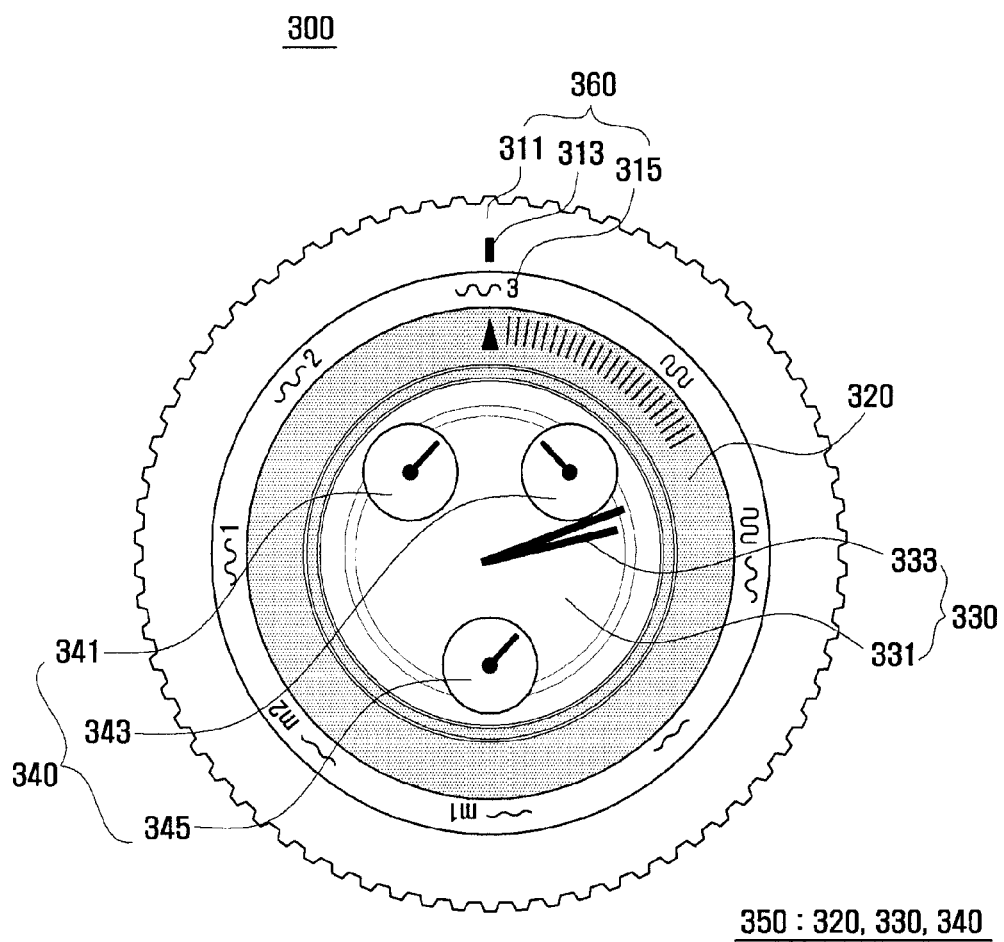
FIG. 3 is a diagram illustrating another exemplary configuration of an information input/output unit in the mobile terminal exemplified in FIG. 1.

FIG. 3 is a diagram illustrating an exemplary configuration of another information input/output unit 300 in the mobile terminal exemplified in FIG. 1.

Referring now to FIG. 3, the information input/output unit 300 according to the present exemplary embodiment includes a mechanical information input unit 360 for mechanically adjusting ringtone setting, vibration setting, and mute setting of the mobile terminal 100, a digital information output unit 320, a mechanical information output unit 330, and a mechanical information output unit 340 for outputting information according to a first function, second function, and third function, respectively, of the mobile terminal 100. The mechanical information input unit 360 has the same configuration and function as those of the mechanical information input unit 260 described in FIG. 2 and therefore a detailed description thereof is omitted.

The digital information output unit 320 is formed with an LCD or an OLED, and can also be formed from any thin-film technology screen, similar to the digital information output unit 220 and thus outputs specific information as a text or an image. The digital information output unit 320 is provided in a ring shape by disposing a ring-shaped housing at a display device formed in a quadrangle so as to be disposed in a ring shape, as shown in FIG. 3 and a display device separately formed in a ring shape is disposed. The digital information output unit 320 outputs information according to a specific function of the mobile terminal 100, for example various functions such as a communication function, file reproduction function, clock function, and widget information output function. In more detail, when a communication function of the mobile terminal 100 is activated, the digital information output unit 320 outputs information necessary for a communication function, for example, a message notifying reception of a communication request and a phone number of another mobile terminal and outputs, when another mobile terminal is registered at the phonebook, information registered at a phonebook and communication elapse time information according to a communication connection. Further, the digital information output unit 320 can output, as a text such as numerals or a specific image, time information about a total time period of a reproducing file and a presently reproducing time point when a file reproduction function is activated. The digital information output unit 320 outputs fixed text information, i.e. information about world time. Further, when a widget function is activated in the mobile terminal 100 and the user sets a specific widget, for example a weather widget, the digital information output unit 320 outputs weather information and can output weather information changing according to a time change. The digital information output unit 320 can output the above-described information at a time point in which the corresponding function is activated and output the above-described fixed text information when a separately activated function does not exist. Here, the fixed text information includes text information for describing a function of mechanical structures to be described later or image information corresponding to the text information. The digital information output unit 320 may complexly output the above-described information. For example, when a file reproduction function is activated, the digital information output unit 320 may output information related to file reproduction for a predetermined time period, i.e. information about a name or producer of a reproducing file, reproduction time period information, and information related to a widget after a predetermined time period and may repeatedly output the information.

With continued reference to FIG. 3, the mechanical information output unit 330 is positioned within the digital information output unit 320 and has a circular shape. The mechanical information output unit 330 includes a disk 331 of a circular shape and a spear 333 for indicating the outer circumferential side of the disk 331 at a central axis of the disk 331. When the mechanical information output unit 330 is formed to perform a clock function, the spear 333 includes an hour hand and a minute hand. The disk 331 includes Arabic numerals or Rome characters embossed, engraved, or printed at a predetermined point in order to read a time. When the mechanical information output unit 330 has a clock function, the mechanical information output unit 330 is synchronized to a time of the mobile terminal 100 to output the corresponding time information. For example, after power is supplied to the mobile terminal 100, when the mobile terminal 100 receives time information from a base station or a satellite, the mechanical information output unit 330 is automatically set to correspond to the time information by the control of the controller. When the mobile terminal is in a "slip" state, the mechanical information output unit 330 receives power from a battery and sustains a time display by the control of the controller 160. When power supply from the mobile terminal 100 is interrupted, i.e. when a battery has run down or when a battery is separated from the device, the mechanical information output unit 330 stops. Thereafter, when power supply is resumed, the mechanical information output unit 330 controls to display corresponding time information based on supplied power and time information in which the mobile terminal 100 receives. Further, the mechanical information output unit 330 has a separate small-sized battery power source for supplying power to a clock and thus can indicate appropriate time information for a predetermined time period even in a case where a main power source battery has run down or a main power source battery is separated.

The mechanical information output unit 340 is provided within the mechanical information output unit 330. The mechanical information output unit 340 mechanically displays information corresponding to a specific function of the mobile terminal 100, for example a battery residual quantity display function, reception intensity display function, and message reception display function. For example, the mechanical information output unit 340 includes a mechanical structure 341, mechanical structure 343, and mechanical structure 345. Mechanical structures provided in the mechanical information output unit 340 can have different quantities and sizes according to a designer's intention and functions mapped to the mechanical structures can be changed according to a designer's intention or user setting. That is, the mechanical structure 341, mechanical structure 343, and mechanical structure 345 have the same configuration and function as those of the mechanical structure 241, mechanical structure 243 and thirteen mechanical structure 245 described in FIG. 2. Accordingly, a detailed description of the mechanical structure 341, mechanical structure 343, and mechanical structure 345 is omitted.

Figure 4:
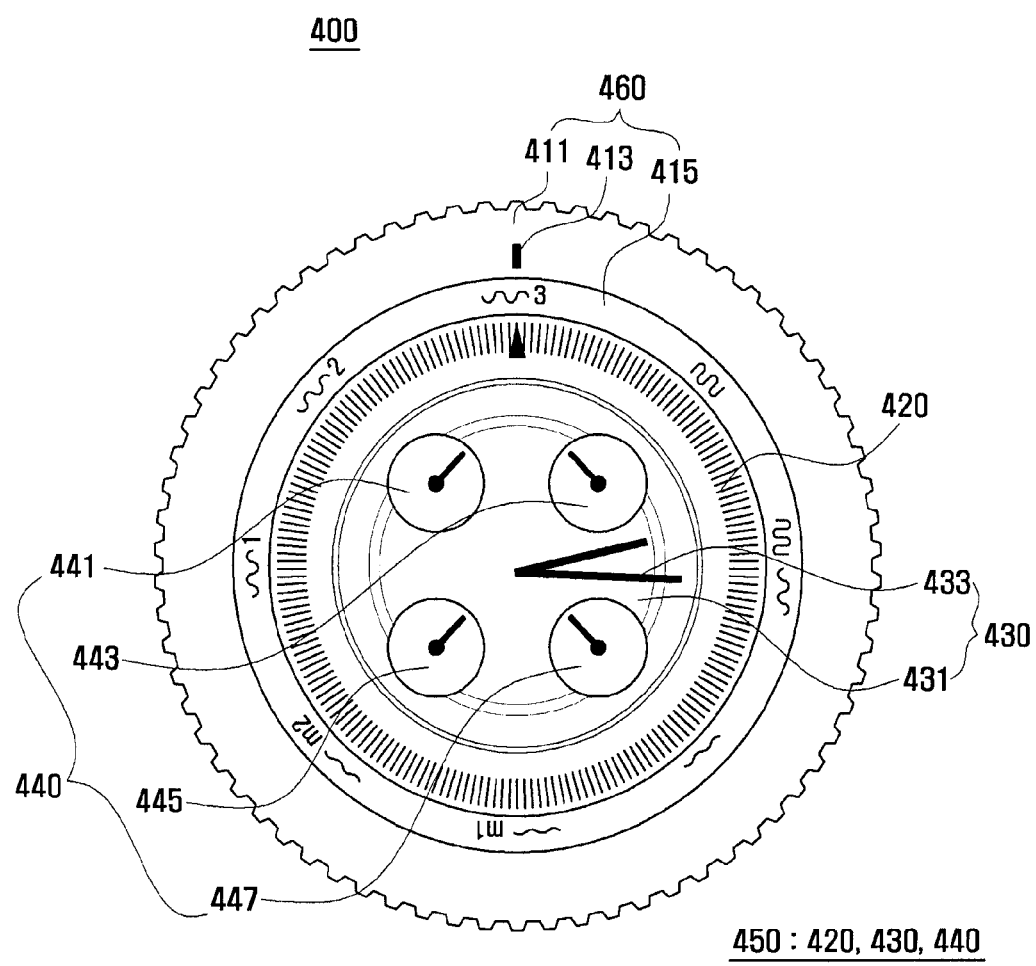
FIG. 4 is a diagram illustrating another exemplary configuration of an information input/output unit in the mobile terminal exemplified in FIG. 1.

FIG. 4 is a diagram illustrating an exemplary configuration of another information input/output unit 400 in the mobile terminal of FIG. 1.

Referring now to FIG. 4, the information input/output unit 400 according to the present exemplary embodiment includes a mechanical information input unit 460 for mechanically adjusting ringtone setting, vibration setting, and mute setting of the mobile terminal 100 and a mechanical information output unit 420, an mechanical information output unit 430, and an mechanical information output unit 440 for outputting information according to a first function, second function, and third function, respectively, of the mobile terminal 100. The mechanical information input unit 460 has the same configuration and function as those of the mechanical information input unit 260 described in FIG. 2 and therefore a detailed description thereof is omitted.

The mechanical information output unit 420 is formed with a mechanical structure and is formed in a substantially ring shape. The mechanical information output unit 420 is disposed to contact with the inner circumferential side of a mechanical information input unit (not shown) in which the outer circumferential side thereof is formed in a ring shape. The mechanical information output unit 420 is formed in a form that can be rotated by a physical force applied in a predetermined direction and thus generates, when a physical force is applied in a specific direction, an input signal in the direction and outputs the input signal to the controller 160. Further, the mechanical information output unit 420 is formed in a ring shape and can be formed in a touch pad form that does not rotate. Accordingly, the mechanical information output unit 420 generates an input signal according to a contact event provided on a surface thereof and outputs the input signal to the controller 160. As a result, the mechanical information output unit 420 performs a function as an input unit, similarly to the mechanical information input unit. The mechanical information output unit 420 outputs information according to a first function, for example, a file reproduction function or a communication function of the mobile terminal 100. For example, when the mobile terminal user reproduces a specific file or performs communication with another mobile terminal, the mechanical information output unit 420 outputs information about a reproduction time period of the corresponding file and a communication time period. In this exemplary embodiment, in the mechanical information output unit 420, alignment marks or numerals are printed to represent time elapse on a surface formed in a ring shape and time elapse is represented by rotating in a predetermined direction according to time elapse. Further, in order to display a world time described in FIGS. 2 and 3, corresponding city names are printed at a predetermined position of a surface of the mechanical information output unit 420.

The mechanical information output unit 430 is positioned within the mechanical information output unit 420 and has a circular shape. The mechanical information output unit 430 includes a disk 431 of a circular shape and a spear 433 for indicating the outer circumferential side of the disk 431 at a central axis of the disk 431. When the mechanical information output unit 430 is formed to perform a clock function, the spear 433 includes an hour hand and a minute hand. The disk 431 includes Arabic numerals or Rome characters embossed, engraved, or printed at a predetermined point in order to read a time. The mechanical information output unit 430 performs the same function as that of the mechanical information output unit 330.

The mechanical information output unit 440 is provided in a specific area within the mechanical information output unit 430. The mechanical information output unit 440 mechanically displays information corresponding to a specific function of the mobile terminal 100, for example a battery residual quantity display function, reception intensity display function, and message reception display function. The mechanical information output unit 440 includes a mechanical structure 441, mechanical structure 443, a mechanical structure 445, and mechanical structure 447, similarly to the mechanical information output unit 240. The mechanical structure 441, mechanical structure 443, mechanical structure 445, and mechanical structure 447 perform the same function as that of each mechanical structure described in FIG. 2.

Figure 5B:
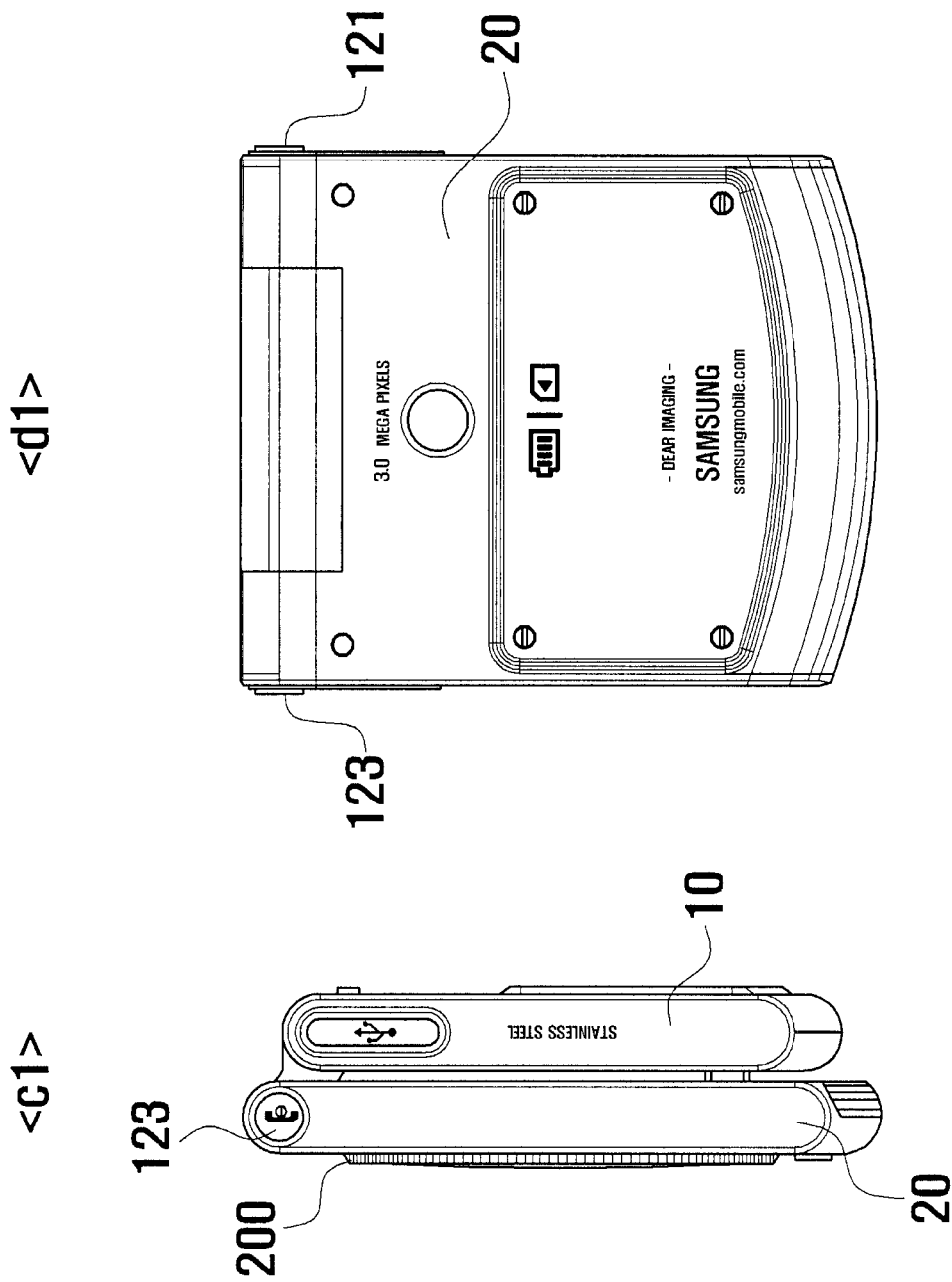

FIG. 5A and FIG. 5B are a perspective view illustrating a folder type mobile terminal having an information input/output unit according to another exemplary embodiment of the present invention.

Particularly, "a1" of FIG. 5A is a left side view of the mobile terminal 100, "b1" is a front view of the mobile terminal 100, "c1" of FIG. 5B is a right side view of the mobile terminal 100, and "d1" is a rear view of the mobile terminal 100.

Referring now to FIG. 5A and FIG. 5B, the mobile terminal 100 according to the present exemplary embodiment includes a first body 10 and second body 20 rotatably coupled by a predetermined angle about a hinge portion, and a case for enclosing the first body 10 and the second body 20. The first body 10 includes a battery and a printed circuit board in which the controller 160 is mounted, and an input unit including a keypad. The information input/output unit 200 is disposed at a front surface of the second body 20, and when a folder is opened, a display unit is disposed in an opposite direction of the information input/output unit 200. The information input/output unit 200 is provided at one side of a case of the second body 20. Further, an environment setting unit 201 for setting an environment for a specific portion of the information input/output unit 200 is provided in an area other than an area in which the information input/output unit 200 of the second body 20 is provided. A surface of the environment setting unit 201 is formed in an uneven form, and the environment setting unit 201 is formed to rotate in a predetermined direction after the user contacts a corresponding surface. The environment setting unit 201 supports more than one specific environment of the information input/output unit 200 according to the user's rotational setting operation. For example, as the environment setting unit 201 moves by a predetermined angle in a specific direction, text information or image information of the digital information output unit 220, or text information or image information of the digital information output unit 230 described in FIG. 2 can be changed. That is, in at least one of the digital information output unit 220 and the digital information output unit 230, text information or image information representing a function of each mechanical structure included in the thirteen mechanical information output unit 240 can be changed according to operation of the environment setting unit 201. As an example, at least one of the digital information output unit 220 and the digital information output unit 230 describes that the mechanical structure 241 indicates a residual quantity of a battery, and when the environment setting unit 201 rotates while displaying the corresponding information according to such a function, at least one of the digital information output unit 220 and the digital information output unit 230 can output text information or image information representing that the mechanical structure 241 performs another function, for example a message function other than a residual quantity function. Further, a function of the mechanical information input unit can be changed according to an operation control of the environment setting unit 201. That is, when the environment setting unit 201 rotates in a predetermined direction, the mechanical information input unit can change a function that is previously performed, for example a ringtone setting function to a volume adjustment function.

A specific button, for example, a call receiving button 121 and a call termination button 123 are provided to perform specific functions, for example a communication function without opening a folder in a specific area of the hinge portion of the mobile terminal 100.

The mobile terminal 100 according to the present exemplary embodiment having such a structure enables the user to intuitionally recognize information related to various user functions of the mobile terminal 100 through the information input/output unit 200 without checking the display unit through opening of a folder and even in a state where power supply to the mobile terminal 100 is interrupted, information about a state finally stored in the mobile terminal 100 can be acquired. Accordingly, the mobile terminal user can intuitionally recognize information and necessary information can be easily acquired from the mobile terminal 100.

Figure 6A:
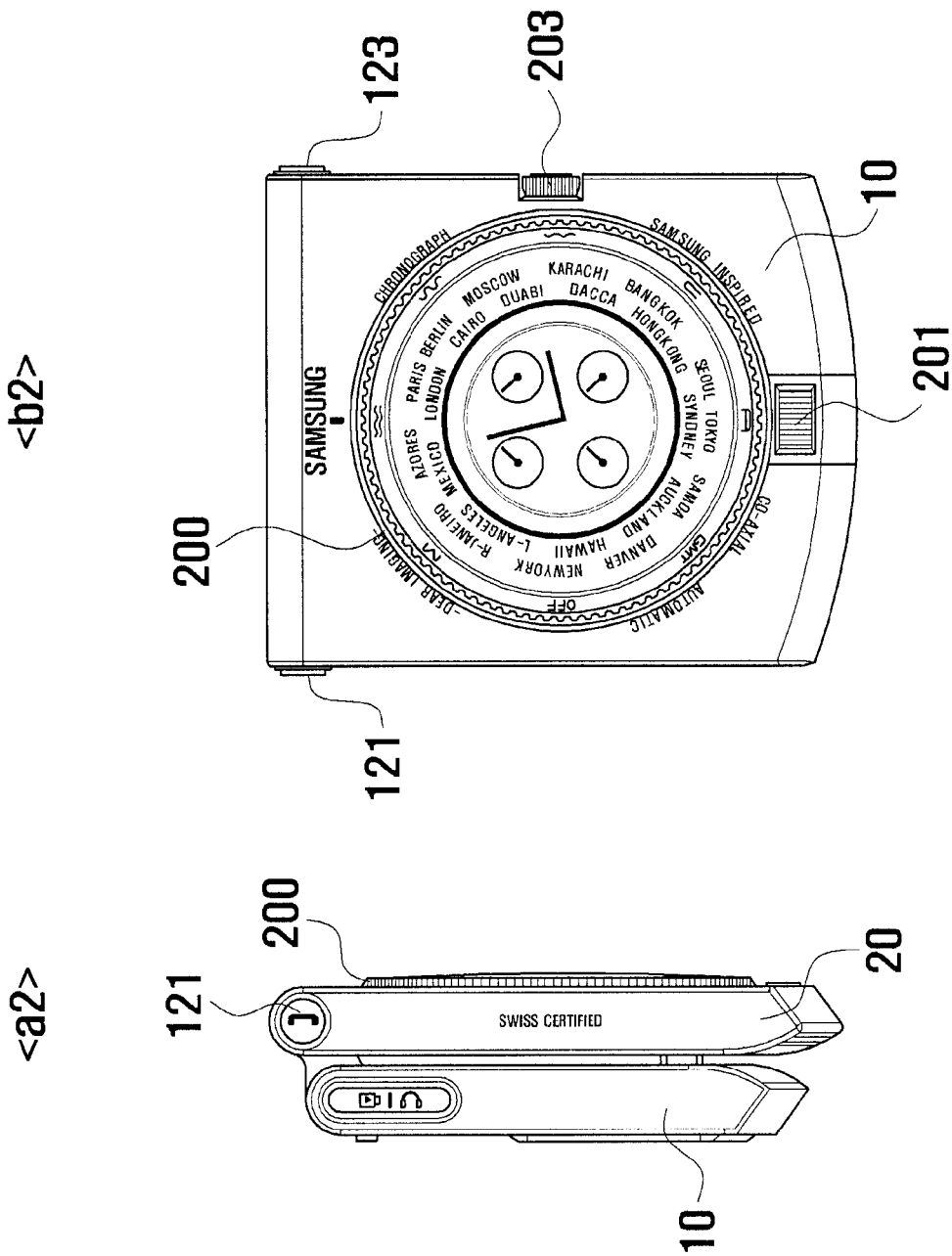

FIG. 6A and FIG. 6B are a perspective view illustrating a folder type mobile terminal having another information input/output unit according to another exemplary embodiment of the present invention.

Referring now to FIG. 6A and FIG. 6B, "a2" is a left side view of the mobile terminal 100, "b2" is a front view of the mobile terminal 100, "c2" is a right side view of the mobile terminal 100, and "d2" is a rear view of the mobile terminal 100.

In FIG. 6A and FIG. 6B, the mobile terminal 100 according to the present exemplary embodiment preferably includes a first body 10 and second body 20 rotatably coupled by a predetermined angle about a hinge portion. The first body 10 includes a printed circuit board in which a battery and the controller 160 are mounted, and an input unit including a keypad. The information input/output unit 200 is disposed at a front surface of the case of the second body 20, and when a folder is opened, a display unit is disposed in an opposite direction of the information input/output unit 200. Further, an environment setting unit 201 for setting an environment for a specific portion of the information input/output unit 200 is provided in an area other than an area in which the information input/output unit 200 of the second body 20 is provided. A surface of the environment setting unit 201 is formed in an uneven form, and the environment setting unit 201 is formed to rotate in a predetermined direction after a user contacts a corresponding surface. The environment setting unit 201 performs the same configuration and function as those of the environment setting unit 201 described in FIG. 5A and FIG. 5B and thus a detailed description thereof is omitted. The mobile terminal 100 further includes a volume adjustment unit 203, which is a rotation type mechanical structure that can adjust a volume at a side portion thereof. As an outer surface of the volume adjustment unit 203 is formed in an uneven form, the volume adjustment unit 203 supports for the user to easily perform a rotation, and a character for indicating up or down of a volume according to a rotation direction of the volume adjustment unit 203 is printed on a surface of a side portion thereof.

In the above-described folder type mobile terminal, a configuration included in the first body 10 and the second body 20 can be changed according to a designer's intention.

Figure 7:
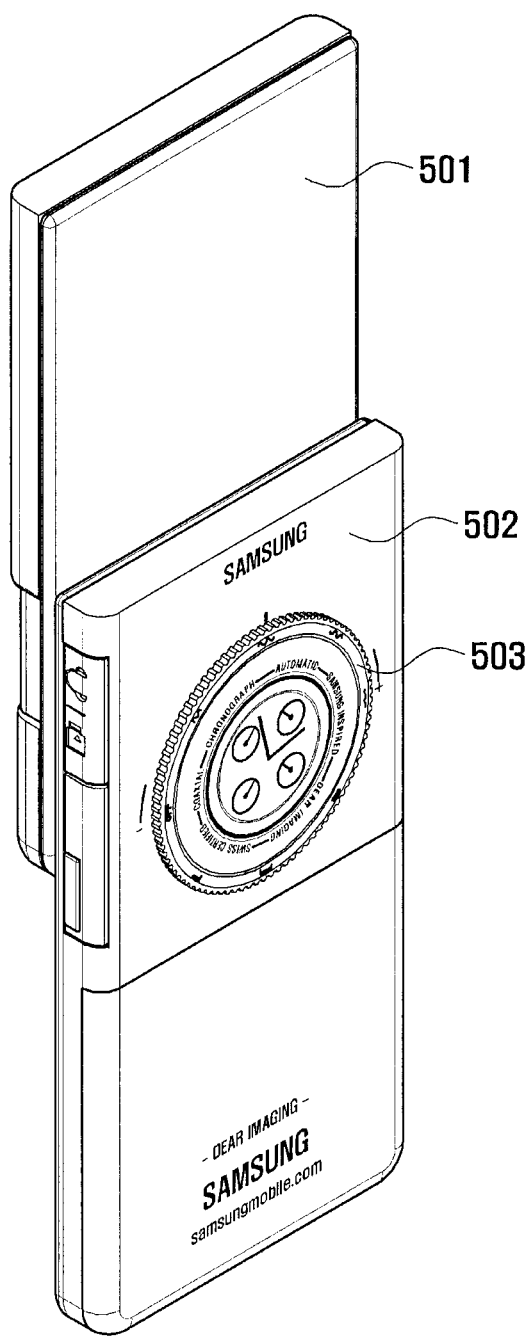
FIG. 7 is a perspective view illustrating a slide type mobile terminal having an exemplary information input/output unit according to still another exemplary embodiment of the present invention.

FIG. 7 is a perspective view illustrating a slide type mobile terminal having another information input/output unit according to another exemplary embodiment of the present invention.

Referring now to FIG. 7, a mobile terminal 500 according to the present exemplary embodiment includes a first body 501 and second body 502 for performing a sliding movement and a case for enclosing the first body 501 and the second body 502, and the first body 501 can perform a sliding movement in a vertical direction based on the second body 502. The first body 501 may perform a rotation sliding movement in a lateral direction or by a predetermined angle based on the second body 502. A display unit is disposed at a front surface of the first body 501, and a keypad is disposed at a front surface of the second body 502. The information input/output unit 503 is disposed preferably at a rear surface of the second body 502. The mobile terminal 500 having such a structure can acquire various information of the mobile terminal 500 such as time information, message reception information, or battery residual quantity information through the information input/output unit 503 formed with a mechanical structure. Accordingly, in order to check information of the mobile terminal 500, the mobile terminal 500 can obtain the corresponding information without performing a sliding operation for activating the display unit or an operation for inputting a specific key. As a result, the mobile terminal 500 can remove unnecessary operation and save battery consumption.

Figure 8:
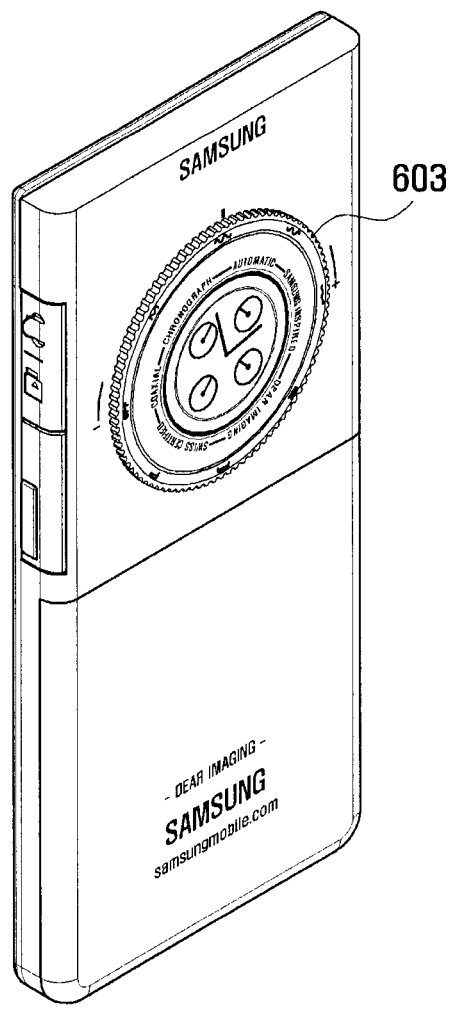
FIG. 8 is a perspective view illustrating a bar type mobile terminal having an exemplary information input/output unit according to another exemplary embodiment of the present invention.

FIG. 8 is a perspective view illustrating a bar type mobile terminal having another information input/output unit according to another exemplary embodiment of the present invention.

Referring now to FIG. 8, in a mobile terminal 600 according to the present exemplary embodiment, at a front surface of a case thereof, a display unit is provided and a keypad for inputting a key is provided. The display unit is provided in a full screen form at an entire front surface, and in this case, the keypad may be a key map that is output under a specific condition at one side of the display unit. The information input/output unit 603 is provided at a rear surface of the mobile terminal 600. The information input/output unit 603 is formed with a mechanical structure in order to intuitionally output and input various functions of the mobile terminal 600. For example, an information input unit of the information input/output unit 603 is formed in a substantially shaped ring that can rotate in a predetermined direction by a physical force provided from the outside, and an information output unit is also formed with several ring-shaped or circular mechanical structures in order to output various information. The information output unit can represent a user function of the mobile terminal 600, for example battery residual quantity information, reception signal intensity information, the quantity information of stored messages, and memory residual quantity information. Further, when the mobile terminal user downloads a specific file by connecting to Internet, the information output unit may represent a download processing state. For example, when a specific mechanical structure includes a disk, a spear for indicating a predetermined point of the disk, and character information printed at one side of the disk, the mobile terminal 600 controls to represent a download processing state and download completion by enabling the spear to indicate character information printed at one side of the disk according to a download processing state.

In the above-described description, the mobile terminal preferably includes both an information input unit and an information output unit, however the mobile terminal can include a unit, i.e. only one of an information output unit and an information input unit.

As described above, according to a mechanical input/output device of a mobile terminal of the present invention, a performing function can be intuitionally understood while minimizing operation necessary for controlling the mobile terminal, and by providing a familiar external appearance to the user, aesthetic stability can be provided.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mechanical information input/output device of a mobile terminal comprising:
a case for forming an external form;
a mechanical information output unit provided at one side of the case and formed with at least one mechanical structure; and
an environment setting unit provided at one side of the case that can be rotated by a physical force provided in one direction for generating an input signal for changing setting of said at least one user function indicated by the mechanical information output unit upon rotating by a predetermined angle,
wherein the mechanical information output unit represents information of a function of the mobile terminal by arranging the at least one mechanical component, and a position, order or arrangement of the at least one mechanical structure is physically changed according to at least one function of the mobile terminal.

2. The mechanical information input/output device of claim 1, wherein the at least one mechanical structure comprises one or more of:
a first mechanical structure for displaying a residual amount of a battery of the mobile terminal;
a second mechanical structure for displaying a residual amount of a memory of the mobile terminal;
a third mechanical structure for displaying a reception signal intensity of the mobile terminal;
a fourth mechanical structure for displaying a message function of the mobile terminal;
a fifth mechanical structure for displaying a communication time period according to a communication function and a file reproduction time period according to file reproduction of the mobile terminal; and
a sixth mechanical structure for displaying time information according to a time display function of the mobile terminal.

3. The mechanical information input/output device of claim 1, further comprising a first digital information output unit for outputting the information of the at least one function of the at least one mechanical structure as text information or image information.

4. The mechanical information input/output device of claim 3, wherein the first digital information output unit outputs at least one of time information including a communication request reception information, communication connection information, a communication time period according to communication connection, and a file reproduction time period according to a file reproduction of the mobile terminal as at least one of a text and an image.

5. The mechanical information input/output device of claim 3, further comprising a second digital information output unit displaying time information according to a time display function of the mobile terminal as at least one of a text and an image.

6. The mechanical information input/output device of claim 5, wherein the second digital information output unit outputs the at least one function corresponding to the at least one mechanical structure as text information or image information.

7. The mechanical information input/output device of claim 1, wherein the at least one mechanical structure comprises one or more of:
   a panel having one of a circular shape and a polygonal shape;
   at least one pointer for indicating a specific point of the panel having a particular parameter value to correspond to information according to the at least one function; and
   a display mark printed at a predetermined point of the panel.

8. The mechanical information input/output device of claim 1, further comprising an information input unit provided at one side of the case and for generating different input signals by changing the position, order or arrangement of a specific structure included in at least one mechanical structure of the information input unit in order to set, adjust or manipulate at least one user function of the mobile terminal.

9. The mechanical information input/output device of claim 8, wherein the information input unit comprises at least one of:
   a rotation unit for rotating in a predetermined direction by a physical force provided from an exterior of the mechanical information input/output device;
   an alignment mark for providing a reference point to recognize an amount of a rotation operation; and
   a function display mark for notifying each function of the mobile terminal indicated by the alignment mark of the rotation unit.

10. The mechanical information input/output device of claim 9, wherein the information input unit generates at least one of:
   an input signal for changing a ringtone setting according to the rotation;
   an input signal for changing a volume level setting according to the rotation;
   an input signal for changing a vibration level setting according to the rotation;
   an input signal for changing a mute setting according to the rotation; and
   an input signal for changing a response message upon a mechanical information input/output device mute setting according to the rotation.

11. The mechanical information input/output device of claim 1, wherein an outer wall of the environment setting unit is formed in an uneven form.

12. The mechanical information input/output device of claim 1, further comprising a volume adjustment unit provided at one side of the case according to rotation by a physical force provided in one direction and for generating an input signal for changing a volume level upon rotating by a predetermined angle.

13. The mechanical information input/output device of claim 12, wherein an outer wall of the volume adjustment unit is unevenly formed.

14. The mechanical information input/output device of claim 1, wherein the case comprises a first body and a second body having a folder type shape for performing a hinge operation about a hinge portion, wherein the mechanical structure is disposed in a rear direction based on a front surface of the first body in which a display unit is provided.

15. The mechanical information input/output device of claim 1, wherein the case is formed in an integral bar shape, and the mechanical structure arranged at a predetermined position of a rear case based on a front surface in which a display unit is provided.

16. The mechanical information input/output device of claim 1, wherein the case is formed in a slide type form in which the first body and a second body contact each other and performs a slide movement in a predetermined direction by an outer physical force, and the mechanical structure is disposed at an outer case of the second body for performing a slide movement to the first body in which a display unit is provided.

17. A mobile terminal comprising:
   a case forming an external form;
   a mechanical information input/output device provided on a side of the case, the mechanical information input/output device comprising: a mechanical information output unit formed with at least one mechanical structure; and
   an environment setting unit provided at one side of the case that can be rotated by a physical force provided in one direction for generating an input signal for changing setting of said at least one user function indicated by the mechanical information output unit upon rotating by a predetermined angle,
   wherein the mechanical information output unit represents information of a function of the mobile terminal by arranging the at least one mechanical structure, and a position, order or arrangement is physically changed according to at least one function of the mobile terminal.

18. The mobile terminal of claim 17, further comprising an information input unit for generating different input signals by changing the position, order or arrangement of a specific structure included in at least one mechanical structure of the information input unit in order to set, adjust or manipulate at least one user function of the mobile terminal, wherein the information input unit comprises:
   a rotation unit for rotating in a predetermined direction by a physical force provided from exterior of the mechanical information input/output device;
   an alignment mark for providing a reference point to recognize an amount of a rotation operation; and
   a function display mark indicating each function of the mobile terminal referenced by the alignment mark of the rotation unit.

19. The mobile terminal of claim 17 wherein the at least one mechanical structure comprises at least one of:
   a first mechanical structure for displaying a residual amount of a battery of the mobile terminal;
   a second mechanical structure for displaying a residual amount of a memory of the mobile terminal;

a third mechanical structure for displaying a reception signal intensity of the mobile terminal;
a fourth mechanical structure for displaying a message function of the mobile terminal;
a fifth mechanical structure for displaying a communication time period according to a communication function and a file reproduction time period according to file reproduction of the mobile terminal; and
a sixth mechanical structure for displaying time information according to a time display function of the mobile terminal.

* * * * *